Dec. 27, 1955   C. E. CARTER ET AL   2,728,792
DEMETALLIZING A METAL CARBONYL-CONTAINING GAS
Filed Nov. 12, 1952
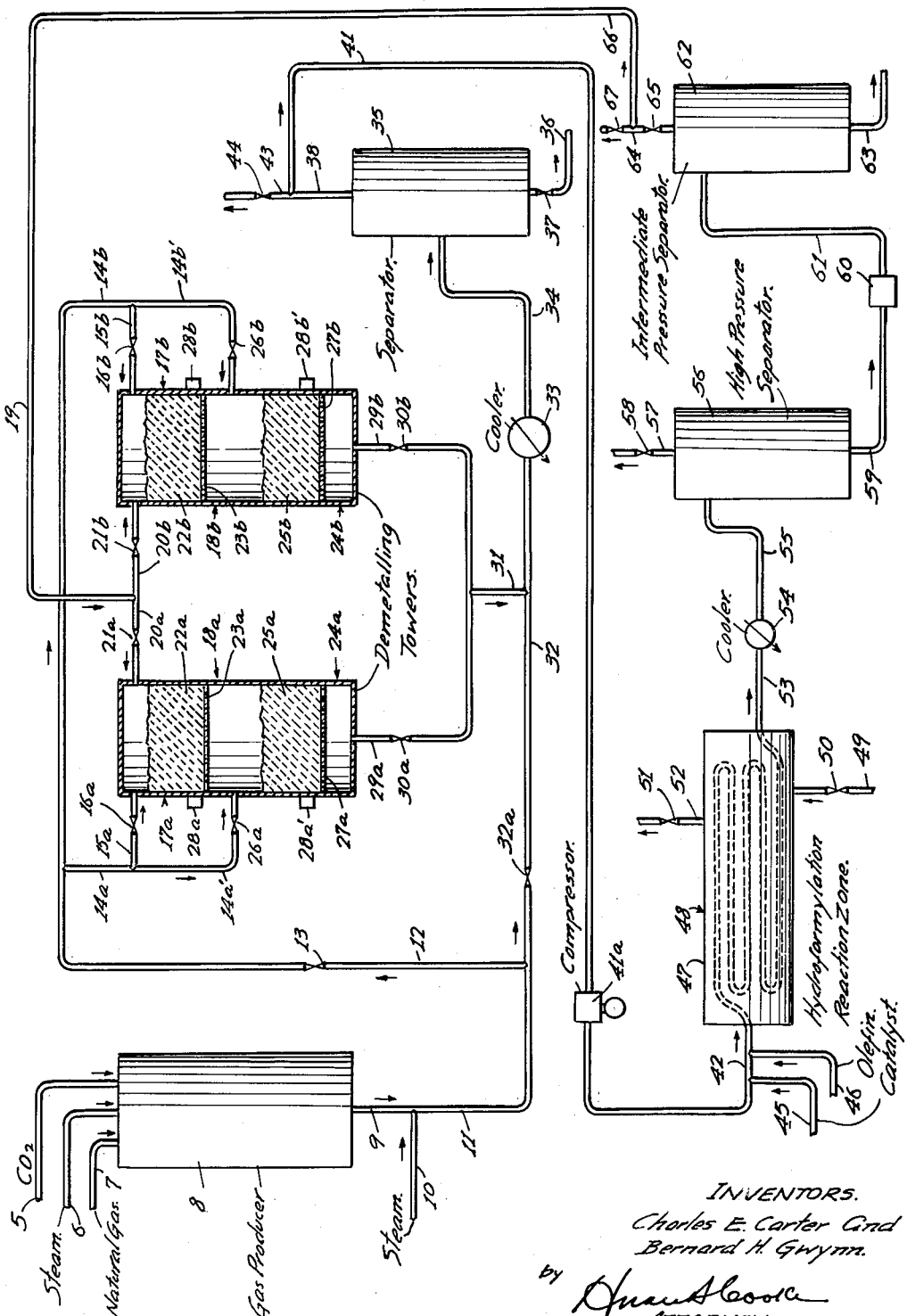
INVENTORS.
Charles E. Carter and
Bernard H. Gwynn.
by Duane A. Cook
ATTORNEY:-

United States Patent Office 2,728,792
Patented Dec. 27, 1955

2,728,792

DEMETALLIZING A METAL CARBONYL-CONTAINING GAS

Charles E. Carter, Canonsburg, and Bernard H. Gwynn, Tarentum, Pa., assignors, by direct and mesne assignments, to Gulf Research & Development Company, Pittsburgh, Pa., a corporation of Delaware Application November 12, 1952, Serial No. 320,094

6 Claims. (Cl. 260—604)

This invention relates to a process and apparatus for removing metals from a synthesis gas comprising hydrogen and carbon monoxide and containing the metals as carbonyls. More particularly, this invention relates to a process and apparatus for removing catalytic metals and metals employed for making steel alloys from a synthesis gas containing the catalytic and alloying metals as carbonyls.

During the hydroformylation of olefins, which is also known as the carbonylation or oxonation of olefins, a product stream is produced which contains a mixture of hydroformylation reaction products and unreacted olefins, carbon monoxide and hydrogen. The hydroformylation reaction products usually contain a large proportion of aldehydes and smaller proportions of alcohols, acetals, and other organic products. The product stream is discharged from the hydroformylation stage at a hydroformylation pressure which is usually about 1500 to about 4500 pounds per square inch, and a hydroformylation temperature of about 100° to about 600° F.

The hydroformylation product stream also contains, in addition to the products mentioned above, a catalytic metal carbonyl. The catalytic metal is originally introduced into the hydroformylation reaction stage as the carbonyl, or is converted to the carbonyl in the reaction zone. Cobalt or iron is usually employed as the catalytic metal.

The walls of the hydroformylation reactor and the transfer lines used in the hydroformylation stage are usually made of iron or iron alloys. During the hydroformylation stage some of the metal in the walls of the hydroformylation reactor and the transfer lines finds its way into the hydroformylation reaction product where it appears as a metal carbonyl. In this way iron carbonyl is produced when the walls of the reactor and the transfer lines are constructed of iron and carbonyls of alloying metals are also produced when the walls are constructed of metal alloys. The alloying metal carbonyls, in addition to iron carbonyl, usually comprise those of nickel, chromium, and molybdenum. The hydroformylation reaction products, the unreacted olefins, carbon monoxide, and hydrogen and the metal carbonyls together comprise the hydroformylation stage products or the total reaction products from the hydroformylation stage.

The hydroformylation stage products leaving the reaction zone are generally cooled from a reaction temperature, which may be about 350° F., to a temperature of about 100° to 120° F. and may subsequently be passed to an intermediate pressure separator wherein the liquid hydroformylation stage product is separated from unreacted synthesis gas. The liquid hydroformylation stage product is removed from the separator for further processing, while the synthesis gas recovered may be recycled to the fresh synthesis gas feed line where it joins fresh synthesis gas to be used in the hydroformylation reaction zone.

The metal carbonyls in the hydroformylation stage products are volatile, and, consequently, the synthesis gas separated from the liquid portion of the hydroformylation stage product and recycled to the synthesis gas feed line carries some metal carbonyls along with it by reason of their volatility. Prior to introducing the synthesis gas into the hydroformylation reaction zone the synthesis gas is compressed to reaction pressure by passing it through a gas compression pump wherein the temperature is high enough to decompose the metal carbonyls and deposit metal on the rotors or pistons thereof, thus causing operating and maintenance difficulties because of the resulting unbalance. Even small amounts of metal are objectionable since, with large throughput of synthesis gas, the metal deposits gradually build up to cause the above-mentioned difficulty.

We have found that a synthesis gas substantially free of metal carbonyls or free metals may be obtained from the synthesis gas carrying metal carbonyls recovered from the hydroformylation stage product and recycled to the fresh synthesis gas feed line by a process which comprises separating a gaseous phase comprising synthesis gas and metal carbonyls from the hydroformylation stage product, continuously passing said gaseous phase and hot fresh synthesis gas at an elevated temperature to a demetalling chamber, adjusting the amount and temperature of said fresh synthesis gas so as to obtain a mixture of fresh synthesis gas and recycled synthesis gas having a temperature above the decomposition temperature of the metal carbonyl present having the highest decomposition temperature, and removing the resulting substantially metal-free mixture comprising fresh synthesis gas and recycled synthesis gas from the demetalling zone.

When a cobalt compound is employed as the catalyst in the hydroformylation stage, cobalt carbonyl is the metal carbonyl with the lowest decomposition temperature present in the hydroformylation mixture, and the hydroformylation product is cooled below about 150° F. before reducing the pressure to the intermediate pressure. When iron is employed as the catalyst in the hydroformylation stage, the hydroformylation product is cooled to a temperature below about 300° F. before reducing the pressure. The synthesis gas mixture in the demetalling zone is heated above about 150° F., and preferably about 165° to about 212° F., to decompose cobalt carbonyl, while it is heated above about 300° F., and preferably about 340° to about 420° F., to decompose iron and other metal carbonyls.

When cobalt is employed as the catalyst, preferred results are obtained when the demetalling chamber is divided into two zones, one being a decobalting zone, the other being a zone where other metal carbonyls are decomposed. For such an embodiment fresh synthesis gas is added to synthesis gas containing cobalt carbonyls in an amount and at a temperature sufficient to obtain a temperature above about 150° F. and below about 300° F. in the first, or decobalting, zone. The decobalted hydroformylation product is removed from the decobalting zone and passed to the second zone, and additional fresh synthesis gas is then added to the second demetalling zone to obtain a new mixture at a temperature above about 300° F. and preferably about 320° to about 420° F. Iron and other metal carbonyls are thus decomposed in the second demetalling zone and a substantially metal-free mixture comprising fresh synthesis gas and recycled synthesis gas is removed from the demetalling zone.

The process of our invention can best be understood by reference to the attached drawing, the single figure of which shows a diagrammatic representation of apparatus which can be employed for carrying out the process of our invention.

Referring to the drawing, carbon dioxide is introduced by line 5, steam by line 6 and natural gas by line 7 to gas producer 8. Fresh synthesis gas is removed from gas producer 8 by line 9 at a synthesis gas temperature such as about 1500° F. Steam is passed into line 9 by line 10 to cool the fresh synthesis gas to a temperature of about 800° F., and the resulting mixture of synthesis gas and steam is removed by line 11. A portion of the synthesis gas and steam mixture is passed by line 12 containing valve 13, line 14a and line 15a containing valve 16a into the upper portion 17a of demetalling tower 18a. Tower 18b is operated in parallel or in place of tower 18a while tower 18a is being reconditioned. However, to simplify the description, reference will be made only to tower 18a, it being understood that tower 18b is operated in a similar manner. Accordingly, similar reference numerals, but having different subscripts, have been employed to identify similar parts of the demetalling towers.

Synthesis gas recycled from a hydroformylation stage in a manner which will be described hereinafter is introduced at a temperature of about 110° F. into the upper portion 17a of demetalling tower 18a by line 19 and line 20a containing valve 21a. The mixture of fresh and recycled synthesis gas at a temperature of about 150° to about 300° F. is passed down through an inert packing material 22a, such as pumice, supported on a foraminous plate 23a in the upper portion 17a of demetalling tower 18a. Cobalt carbonyl in the recycled synthesis gas is thereby decomposed and free cobalt is deposited upon the pumice contained in the upper portion of the demetalling tower. A substantially cobalt-free synthesis gas is removed from the bottom of the foraminous plate 23a in the upper portion 17a of demetalling tower 18a and is passed into the bottom portion 24a thereof. A mixture of fresh synthesis gas and steam at a temperature of 800° F. is introduced by line 14a and line 14a' containing valve 26a into gas demetalling tower 18a below foraminous plate 23a. This mixture of fresh synthesis gas, steam and the decobalted recycled synthesis gas is passed through an inert packing material 25a, such as pumice, supported on foraminous plate 27a. As the resulting mixture at a temperature in the range of about 340° to about 420° F. is passed through the lower bed of pumice, iron and other metal carbonyls are decomposed and free iron and other alloying metals are deposited upon the pumice. Manholes 28a and 28a' are provided for removing the pumice from demetalling tower 18a as desired or at intervals during which demetalling tower 18b is on stream.

A substantially metal-free mixture of fresh and recycled synthesis gas is removed from tower 18a by line 29a containing valve 30a and by line 31. The demetalled mixture of fresh and recycled synthesis gas is combined with a fresh mixture of synthesis gas and steam from line 11 in line 32 containing valve 32a and the resulting mixture is passed to cooler 33 where it is cooled to a temperature below about 200° F. The cooled mixture of fresh and recycled synthesis gas is then passed by line 34 to separator 35. Water is removed from separator 35 by line 36 containing valve 37 and is discharged.

The cooled demetalled mixture of fresh and recycled synthesis gas is removed by line 38 and is passed by line 41 through gas compressor 41a to line 42, where it is combined with other charge materials, and then to the hydroformylation stage in the manner which will hereinafter be described. If desired, a portion of the cooled demetalled mixture of fresh and recycled synthesis gas can be removed from the system by line 43 containing valve 44.

The specific method of carrying out the hydroformylation reaction forms no part of the present invention and any suitable procedure may be used such as one involving the use of a fixed bed reactor. Thus we may employ a procedure wherein the synthesis gas, olefin and catalyst, introduced in the form of a salt of the metal, are flowed through an elongated reaction zone under turbulent flow conditions while controlling the temperature by indirect heat exchange with a liquid such as water.

Referring to the drawing, in a typical example, catalyst which may be, for example, the cobalt salt of any suitable organic acid, such as a fatty acid, preferably one containing at least 6 carbon atoms, or a naphthenic acid, is passed by line 45 into line 42, and a suitable olefin, such as heptene, is passed by line 46 to line 42. The resulting mixture of fresh and recycled synthesis gas, catalyst and olefin is passed by line 42 into an elongated reaction zone which, in a preferred embodiment, is in the form of a coil 47 in a body of water under pressure at its boiling point at that pressure in the hydroformylation reaction 48. For example, for a reaction temperature of about 350° F. the water should be maintained at a pressure of about 120 pounds per square inch gauge. The water is introduced through line 49 containing valve 50 and the pressure is maintained by means of a pressure control valve 51 in line 52 which releases the steam generated by reason of the exothermic reaction occurring within coil 47. The elongated reaction zone or coil 47 is extremely long compared to its diameter. Thus it may be a pipe 1 to 5 inches in internal diameter having an elongation factor (ratio of length to diameter) of at least 1440. Under the conditions indicated, the synthesis gas, olefin and catalyst are flowed through the reaction zone under turbulent flow conditions and the desired hydroformylation reaction resulting in the production of aldehydes is accomplished. During the initial stages, the cobalt salt is apparently converted to cobalt carbonyl and therefore the hydroformylation product removed through line 53 contains aldehydes, some alcohols, unreacted olefins and synthesis gas and cobalt carbonyl. Also even in cases where iron is not employed as a catalyst, the product frequently contains a small amount of iron and/or other alloying metals which, as has been pointed out hereinabove, is picked up from the equipment employed.

The hydroformylation product at substantially the reaction temperature is then passed by line 53 to cooler 54 to reduce the temperature to about 100° to about 120° F. and then passed by line 55 into high pressure separator 56 from which excess synthesis gas is removed through line 57 containing pressure control valve 58. The hydroformylation product is passed from separator 56 through line 57 containing pressure control valve 58. The hydroformylation product is passed from separator 56 through line 59 to a pressure reducing valve 60 wherein the pressure is reduced to an intermediate pressure of about 300 to about 450 pounds per square inch gauge.

Liquid hydroformylation product is then passed by line 61 to intermediate pressure separator 62. Liquid hydroformylation product is removed from intermediate pressure separator 62 and is passed through line 63 for further processing.

Unreacted synthesis gas comprising hydrogen and carbon monoxide and containing metal carbonyl is removed overhead from intermediate pressure separator 62 by line 64 containing pressure control valve 65 and is then recycled by line 66 and line 19 to either or both of the demetalling towers at a temperature of about 110° F. for processing in the manner which has been described hereinabove. If desired, a portion of the synthesis gas containing cobalt and alloying metal carbonyls, can be vented from the system by valved line 67.

An example of the process of our invention will now be described. 12,800 S. C. F./H. of synthesis gas containing hydrogen and carbon monoxide in a mol ratio of 1:1 are removed from gas producer 8 by line 9 at a temperature of about 1400° F. 18,000 S. C. F./H. of super-heated steam are passed by line 10 into the synthesis gas and the resulting mixture at a temperature of 800° F. is removed by line 11. 2250 S. C. F./H. of the 800° F. gas mixture are passed by line 12 through valve 13 to demetalling tower 18a while the remaining gas is passed forward through line 32 where it joins the effluent from line 31. 525 S. C. F./H. of the hot gases passing through valve 13 are led by lines 14a and 15a into the upper portion 17a of demetalling tower 18a. 3500 S. C. F./H. of the recycled synthesis gas at a temperature of 110° F. are passed by lines 19 and 20a into upper portion 17a of demetalling tower 18a. The recycled gas contains 0.024 pound of cobalt and 0.007 pound of iron per 1000 standard cubic feet of recycled gas. 525 S. C. F./H. of the hot gas mixture passing through valve 13 are mixed with the 3500 standard cubic feet of recycled gas in the upper portion 17a of demetalling tower 18a to obtain a mixture having a temperature of about 200° F. 1725 S. C. F./H. of the 800° F. gas mixture passing through valve 13 are passed by line 14a' into lower portion 24a of demetalling tower 18a intermediate catalyst beds 22a and 25a and are there mixed with the effluent from top bed 22a to obtain a mixture temperature of about 380° F. before entering the bottom bed where the iron and alloying metal, if any, are deposited. The purified recycled gas, admixed with the mixture of fresh synthesis gas and steam used for heating them, is then passed into main stream 32 which is at 800° F. and the resultant mixture is passed to cooler 33. It should be noted that the recycle gas enters the system at about 110° F. and leaves cooler 33 at approximately the same temperature, and therefore the duty of cooler 33 is not increased over that normally required to cool the fresh synthesis gas alone.

The steam is removed from the resultant mixture of fresh and recycled synthesis gas in separator 35 and the resulting substantially metal-free mixture of fresh and recycled synthesis gas is passed by lines 41 and 42 into hydroformylation reactor 48. Twenty-one pounds of cobalt catalyst and 1300 pounds of olefin per hour are also introduced into the hydroformylation reactor 48. After passing through the hydroformylation reactor 48, cooler 54, high-pressure separator 56, pressure reducing valve 60 and intermediate pressure separator 62 in the manner previously described, 3500 S. C. F./H. of synthesis gas are then recycled to demetalling tower 18a.

Obviously many modifications and variations of the invention as hereinbefore set forth may be made without departing from the spirit and scope thereof; therefore only such limitations should be imposed as are indicated in the appended claims.

We claim:

1. In a process wherein synthesis gas comprising carbon monoxide and hydrogen are reacted with an olefin in the presence of a catalytic metal in a hydroformylation reaction zone at an elevated pressure and an elevated temperature to obtain a reaction product comprising an aldehyde, unreacted synthesis gas comprising carbon monoxide and hydrogen and at least one metal carbonyl, and in which the unreacted synthesis gas carrying at least one metal carbonyl is subsequently recovered from said reaction product and recycled to the hydroformylation reaction zone, the improvement which comprises passing said recycled synthesis gas mixture and heated fresh synthesis gas to a demetalling chamber, the amount and temperature of the heated fresh synthesis gas entering the demetalling chamber being adjusted to obtain a mixture of fresh synthesis gas and recycled synthesis gas having a temperature higher than the decomposition temperature of the metal carbonyl with the highest decomposition temperature present in said demetalling chamber, whereby metal carbonyl is decomposed to deposit free metal in said demetalling chamber, removing from the demetalling chamber the fresh synthesis gas and recycled synthesis gas substantially free of metal carbonyls and free metal, and passing said fresh and recycled synthesis gas from the demetalling chamber to the hydroformylation reaction zone.

2. A process according to claim 1 in which the catalytic metal employed in the hydroformylation reaction zone comprises cobalt and the metal carbonyl resulting therefrom is cobalt carbonyl.

3. A process according to claim 1 in which the catalytic metal employed in the hydroformylation reaction zone comprises a cobalt salt and the metal carbonyl resulting therefrom is cobalt carbonyl.

4. A process according to claim 1 wherein the metal carbonyls present in the hydroformylation stage products comprise cobalt carbonyl and iron carbonyl, the demetalling chamber is provided with two demetalling zones, and the amount and temperature of the heated fresh synthesis gas entering the first of said two demetalling zones being controlled to obtain temperatures therein higher than the decomposition temperature of cobalt carbonyl but lower than the decomposition temperature of iron carbonyl and the amount and temperature of the heated fresh synthesis gas entering the second of said two demetalling zones being controlled to obtain temperatures therein higher than the decomposition temperature of iron carbonyl.

5. A process according to claim 4 in which a portion of said heated fresh synthesis gas led to the demetalling chamber and said recycled synthesis gas are passed to said first zone and the remainder of said fresh synthesis gas and the effluent from said first zone are passed to said second zone.

6. A process according to claim 5 in which each of said zones contains an inert packing material upon which the free metals resulting from the decomposition of the metal carbonyls deposit.

References Cited in the file of this patent

UNITED STATES PATENTS

| 2,596,920 | Smith et al. | May 13, 1952 |
| 2,604,491 | Hale | July 22, 1952 |

FOREIGN PATENTS

| 655,024 | Great Britain | July 4, 1951 |